US011023356B2

(12) United States Patent
Anders et al.

(10) Patent No.: US 11,023,356 B2
(45) Date of Patent: Jun. 1, 2021

(54) UTILIZATION OF PUBLICLY AVAILABLE SOURCE CODE

(71) Applicant: International Business Machines Corporation, Armonk, NY (US)

(72) Inventors: Kelley Anders, East New Market, MD (US); Jeremy R. Fox, Georgetown, TX (US); Jonathan Dunne, Dungarvan (IE); Gary Denner, Leixlip (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/238,824

(22) Filed: Jan. 3, 2019

(65) Prior Publication Data

US 2020/0218636 A1 Jul. 9, 2020

(51) Int. Cl.
*G06F 11/36* (2006.01)
(52) U.S. Cl.
CPC ................ *G06F 11/3608* (2013.01)
(58) Field of Classification Search
CPC ................................. G06F 11/3608
USPC ....................................... 717/124
See application file for complete search history.

(56) References Cited

U.S. PATENT DOCUMENTS

| | | | | |
|---|---|---|---|---|
| 7,627,855 B2* | 12/2009 | Inoue | ........................ | G06F 8/36 717/120 |
| 8,635,204 B1* | 1/2014 | Xie | .......................... | G06F 8/74 707/709 |
| 8,688,676 B2* | 4/2014 | Rush | ........................ | G06F 8/36 707/706 |
| 8,856,725 B1* | 10/2014 | Anderson | ................ | G06F 8/75 717/103 |
| 9,043,753 B2* | 5/2015 | Fox | ........................... | G06F 8/71 717/120 |
| 10,048,945 B1* | 8/2018 | Makkar | ..................... | G06F 8/33 |

(Continued)

FOREIGN PATENT DOCUMENTS

WO  WO2017134665  8/2017

OTHER PUBLICATIONS

Nagappan et al.; "Preliminary Results on Using Static Analysis Tools for Software Inspection"; Proceedings of the 15th International Symposium on Software Reliability Engineering (ISSRE'04); 2004 (Year: 2004).*

(Continued)

*Primary Examiner* — Qing Chen
*Assistant Examiner* — Clint Thatcher
(74) *Attorney, Agent, or Firm* — Schmeiser, Olsen & Watts, LLP; Michael O'Keefe

(57) ABSTRACT

A method of determining the utility of publicly available source code includes analyzing, by one or more processors of a computer system, source code of an application in development, determining, by the one or more processors of the computer system, efficacy of a publicly available target code sample based a discriminant function analysis model, computing, by the one or more processors of the computer system, a goodness of fit assessment of the publicly available target code sample to the application in development based on the analyzing the source code of the application in development, and determining, by the one or more processors of the computer system, whether to use the publicly available target code sample based on the goodness of fit assessment.

20 Claims, 7 Drawing Sheets

(56) References Cited

U.S. PATENT DOCUMENTS

| | | | |
|---|---|---|---|
| 2007/0028208 A1* | 2/2007 | Maki | G06F 8/30 |
| | | | 717/106 |
| 2016/0371176 A1 | 12/2016 | Adar | |
| 2017/0278421 A1 | 9/2017 | Du et al. | |
| 2019/0079741 A1* | 3/2019 | Makkar | G06F 8/33 |
| 2019/0079853 A1* | 3/2019 | Makkar | G06F 8/36 |

OTHER PUBLICATIONS

Rivard et al.; "Development of a Measure to Assess the Quality of User-Developed Applications"; IEEE 1994 (Year: 1994).*

Eick et al.; "Does Code Decay? Assessing the Evidence from Change Management Data," in IEEE Transactions on Software Engineering (v.27 No. 1) (pp. 1-12); Jan. 2001 (Year: 2001).*

* cited by examiner

UTILIZATION OF PUBLICLY AVAILABLE SOURCE CODE

TECHNICAL FIELD

The present invention relates to software development. More specifically, the invention relates to systems and methods for improving utilization of publicly available source code.

BACKGROUND

Software developers today typically work as part of collaborative teams. Often times, software developers are drawn to utilizing open source frameworks, API and/or standards. Such use may facilitate ensuring future interoperability with future endpoints. Additionally, it is often good practice to utilize public source code to save time and effort, so that a custom solution need not be developed from scratch. With the advent of public code repositories and social media, it has never been easier to find pre-written open source code to solve specific development needs. However, one of the issues with leveraging open source code from public repositories is that the code may work for a specific code base or in a specific instance with dependencies that are not readily known by the developer intending to use the code. For example, if a developer today needed to run a Bash script from Java, there may be many different ways to do it from public code sources but doing so might be risky. If public code was found for performing the Bash script from Java, it may be written with libraries that have since deprecated. Given that developers may run a limited number of unit tests prior to committing to a continuous integration and delivery pipeline, there is a need to better understand if the code presented in public repositories is suitable for use in a given project.

SUMMARY

An embodiment of the present invention relates to a method, and associated computer system and computer program product, of determining the utility of publicly available source code. One or more processors of a computer system analyze source code of an application in development. The one or more processors of the computer system determine efficacy of a publicly available target code sample based a discriminant function analysis model. The one or more processors of the computer system compute a goodness of fit assessment of the publicly available target code sample to the application in development based on the analyzing the source code of the application in development. The one or more processors of the computer system determine whether to use the publicly available target code sample based on the goodness of fit assessment.

DETAILED DESCRIPTION

Figure 1:
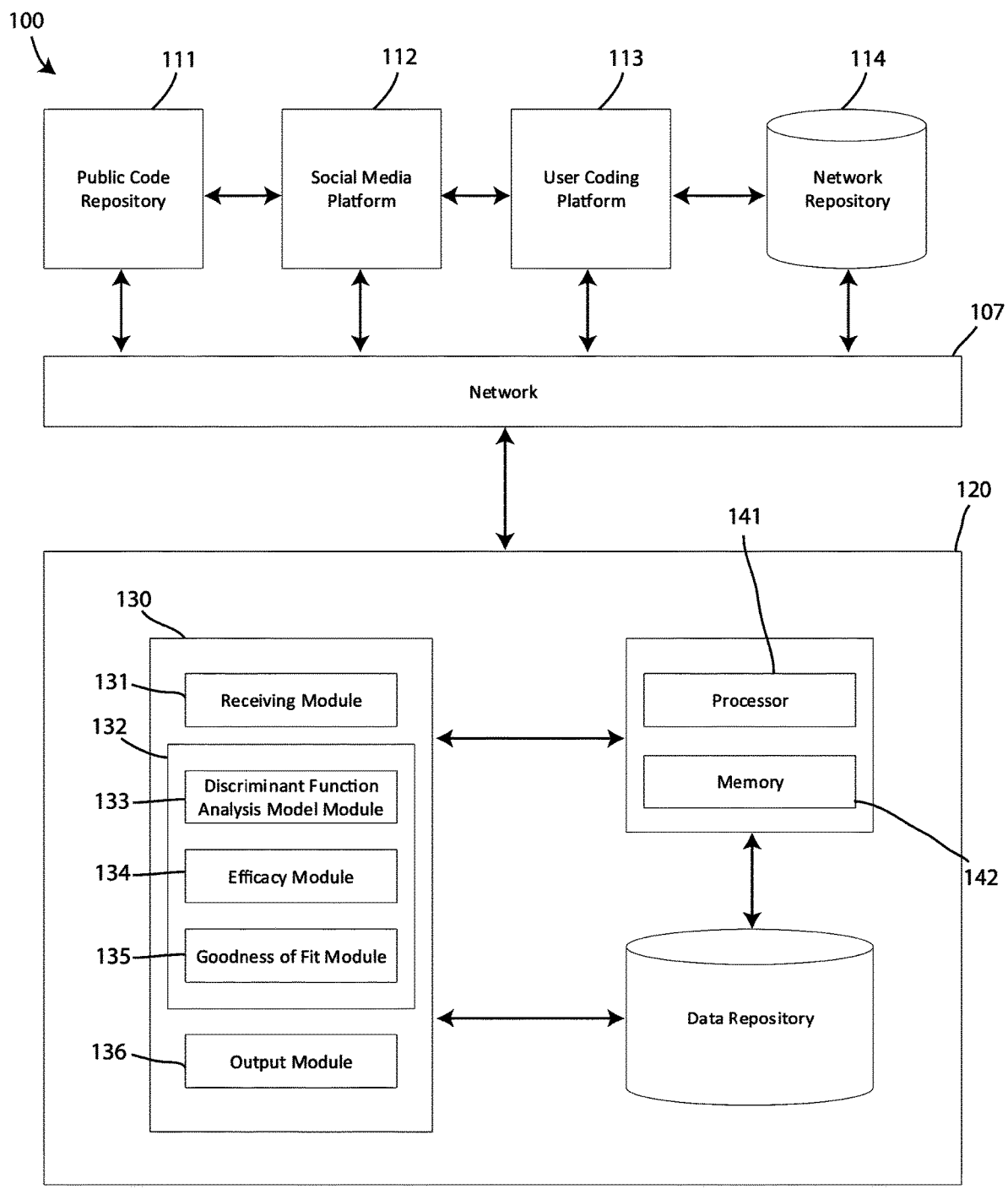
FIG. 1 depicts a block diagram of a system of determining the utility of publicly available source code, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention improves and optimizes computer systems by more precisely predicting the utility of publicly available source code to a software development project. Thus, the present invention contemplates improving the software systems on any computer system that uses software in which the code-writers utilized the methods described herein. Further, embodiments of the present invention described herein may be configured to improve computer performance by ensuring that new software developed incorporates source code that is current and not decayed, rotted, or the like. Thus, embodiments of the present invention, when applied to software development projects, will result in superior computer systems that operate with less bugs, faults or the like, and increased stability.

The present invention further seeks to facilitate and assist in software development by providing a mechanism for determining the utility of publicly available source code to a software development project. For example, embodiments described herein allow software developers to surface the efficacy of public software used in a given software development project. Embodiments described herein further allow software developers to derive a model based approach to code population and determine a Goodness of Fit (GoF) of a code fragment within a software development project. The present invention addresses the need for an analysis of publicly available source code to determine whether a given code fragment, program or the like, is in use today. The present invention provides a ranking system related to a given code fragment, program, or the like, related to the compliance with current environments within which the code resides, newness and current usage of the code, and the like.

The present invention seeks to thus improve both computer systems, and the software development process for developing effective programs for computer systems. With billions of lines of public code existing and running around the world, the present invention seeks to determine the utility in a manner that improves the development process and thereby the computer systems running code developed in accordance with the methods and systems described herein.

Referring to the drawings, FIG. 1 depicts a block diagram of a system for determining the utility of publicly available source code 100, in accordance with embodiments of the present invention. Embodiments of a system for determining the utility of publicly available source code 100 may include the ability to analyze an internal software repository to determine the type of application being developed, derive a discriminant function analysis (DFA) model, determine the efficacy of a publicly available target code sample with the discriminant function analysis model, compute a goodness of fit assessment of the publicly available target code sample, and/or ultimately determine the utility of the publicly available target code sample to a given software development project. Various functionality of the system for determining the utility of publicly available source code 100 is described herein below. It should be understood that the invention is not limited to only determining the utility of publicly available source code, and may be configured to provide any of the various functionality described herein including but not limited to ranking publicly available source code, improving computer performance, improving software compliance, and the like.

The system for determining the utility of publicly available source code 100 may include a public code repository 111, a social media platform 112, a user coding platform 113, a network repository 114 connected over a network 107 to a computer system 120. Each of the public code repository ill, the social media platform 112, the user coding platform 113 and the network repository 114 may each represent a plurality or a single one of the given element 111, 112, 113, 114. Some or all of the public code repository 111, the social media platform 112, the user coding platform 113 and the network repository 114 may be interconnected to others of these devices. While FIG. 1 shows the public code repository 111, the social media platform 112, the user coding platform 113 and the network repository 114 directly connected to adjacent elements 111, 112, 113, 114, any interconnection (e.g. non-adjacent) of elements 111, 112, 113, 114 is contemplated. Further, while each of the elements 111, 112, 113, 114 are shown as separate features of the system for determining the utility of publicly available source code 100, in some embodiments one or more of the elements 111, 112, 113, 114, may be combined or contain overlapping structure and functionality (e.g. the public code repository 111 may include functionality or features attributed in the present description to the social media platform 112).

The public code repository 111 represents one or more file archives, source code hosting facilities, web hosting facilities, or the like. The public code repository 111 is configured to store source code for any application such as for software or web pages, in a public way. The public code repository 111 may be configured to support version control, bug tracking, release management, mailing lists, or documentation, for example, for the source code files hosted thereon. The public code repository 111 may facilitate, for example, source code management (SCM), access control, and collaborative features. While the public code repository 111 is a public repository, code repositories that require a subscription or payment for access of the stored source code are considered a public repository for the purposes of the present invention. The public code repository 111 may include source code for any language, programming environment, or the like. The public code repository 111 may include cloud-based functionality and version control services.

The social media platform 112 represents one or more social media platforms that relate to software development. For example, the social media platform 112 may include a question and answer interface for disseminating knowledge related to computer programming through social media. The social media platform 112 may integrate a ratings system for rating or otherwise voting on the accuracy of an answer. The social media platform 112 may include forum features for allowing users to make posts related to software development or programming. For example, the social media platform 112 includes any social media platform where users publicly discuss software development, post code, or otherwise communicate or exchange ideas related to software development. Like the public code repository 111, the social media platforms 112 may be a public platform. However, the public code repository may require a fee, an account, or require some other threshold to be met in order to obtain access to the information or data contained within the social media platform 112.

The user coding platform 113 represents any computing platform, digital platform or workbench. The user coding platform 113 is an environment in which a computer program is developed and/or executed. The user coding platform 113 may include hardware, an operating system, a web browser and/or associated application programming interfaces. The user coding platform 113 may include an application such as a spread sheet or word processor which hosts software written in an application-specific scripted language. The user coding platform 1' may include a virtual machine (VM) such as the Java virtual machine. The user coding platform 113 may be an integrated development environment (IDE). The user coding platform 113 may be a customizable programming platform and may include a source code editor, build automation tools, and a debugger. The user coding platform 113 may be configured with intelligent code completion. Any user coding platform 113 is contemplated that facilitates development of software by users.

The network repository 114 is a data collection area on the network 107 which may back up and save all the data transmitted back and forth between the nodes of the network 107. For example, the network repository 114 may be a data center saving and cataloging data sent between the nodes of the network 107. The network repository 114 uses this data to generate databases related to the information received. In some embodiments, a data collection center housing the network repository 114 may include an analytic module capable of analyzing each piece of data being stored by the network repository 114, Further, the computer system 120 may be integrated with or may be a component of the data collection center housing the network repository 114. In some alternative embodiments, the network repository 114 may be a local repository that is connected to the computer system 120.

The network 107 is any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to the public code repository 111, the social media platform 112, the user coding platform 113 and the network repository 114 via the network 107.

Embodiments of the computer system 120 is shown including a module structure 130 that includes a receiving module 131, an analytics module 132, and an output module 136. The analytics module 132 may include sub-modules such as a discriminant function analysis model module 133, an efficacy module 134, and a goodness of fit module 135. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

The computer system 120 is shown as a computer system that is separated from a user coding platform or workbench, but connected to the user coding platform or workbench via the network 107. In other embodiments, the computer system 120 may alternatively represent a user coding platform or workbench, such as the user coding platform 113 described herein above. In such an embodiment, it is contemplated that the modules and functionality thereof described herein are incorporated into a user coding platform. In the case that the computer system 120 is a separate system (as shown), the computer system 120 may be a cloud-based application that integrates into, or adds onto the functionality of, a user coding platform. It is also contemplated to incorporate the functionality of the module structure 130 into a combination of a local workbench and a cloud-based and/or hosted solution.

Embodiments of the receiving module 131 include one or more components of hardware and/or software program code for obtaining, retrieving, collecting, or otherwise receiving information from the public code repository 111, the social media platform 112, the user coding platform 113 and/or the network repository 114. In an exemplary embodiment, the receiving module 131 is configured to receive public software or source code from the public code repository 111, or information related to public software or source code from the social media platform 112. The receiving module 131 is further configured to receive information related to software development projects currently being written by users on the user coding platform 113. The receiving module 131 provides information received by computer system 120 from the public code repository 111, the social media platform 112, the user coding platform 113 and/or the network repository 114 to be stored in the data repository 125.

Referring still to FIG. 1, embodiments of the computer system 120 shown further includes an analytics module 132. Embodiments of the analytics module 132 include one or more components of hardware and/or software program code for analyzing information received by the receiving module 131 and/or stored in the data repository 125. The analytics module 132 may be configured to analyze information in real time, or as the information is received by the receiving module 131. The analytics module 132 may be configured to perform analytics as described herein when requested by a user of the computer system 120. The analytics module 132 may be configured to automatically and/or at predetermined intervals perform analytics. The analytics module 132 may be a modeling engine or the like and may be configured to analyze information received by the receiving module 131.

The analytics module 132 is configured to analyze the source code of an application in development. The application in development may refer to source code that is currently in development by one or more developers. It is contemplated that the application in development is a project that either has already incorporated publicly available source code samples. Alternatively, the application in development is a project where it is desirable for publicly available source code to be incorporated therein in the future if, for example, the publicly available source code is determined to be appropriate for incorporation. The source code in development may be written in any programming language or environment on any user coding platform by any number of software developers.

In one embodiment, the analytics module 132 is be configured to determine the type of application in development from the analyzing. For example, the analytics module 132 may be configured to determine the programming language, environment, of the application in development. The analytics module 132 may be configured to determine the type of software, such as whether the software is a native application, a hybrid application or a web application. The analytics module 132 may be configured to determine the category of the application, such as whether the application in development is a word processing application, database software, spreadsheet software, multimedia software, presentation software, enterprise software, information worker software, educational software, simulation software, content access software, application suites, product development software or the like. The analytics module 132 may be configured to determine the type of software development category of a given application, such as web development, mobile development, data science, application development, hack end development, software tools development, API development, embedded systems development, security software development, cloud computing development, or the like. Any type of type-determination is contemplated for execution by the analytics module 132.

The analytics module 132 may be determined to analyze and categorize the application in development into any appropriate category or categories with any degree of specificity necessary to draw meaningful conclusions about the application in development. The determination of the type of application may include determining whether the program or application operates on a particular platform or type of computing system. The analytics module 132 may be a machine learning module and may incorporate artificial intelligence, deep learning and/or artificial neural networks, in order to better identify patterns and characterize applications in development as more information and applications in development are analyzed.

The analyzing of the software in development to determine a type may further include prompting and receiving developer input regarding the application in development. For example, the computer system 120 may be configured to request information from the developer regarding the type of application in development and use this information to characterize and/or categorize and/or determine the type of application in development. Such user, developer and/or client input may be stored and used by the analytics module 132 for the purposes of machine learning—i.e. teaching the module structure 130 how to better characterize software in development into types and categories.

Embodiments of the discriminant function analysis model module 133 include one or more components of hardware and/or software program code for analyzing one or more publicly available target code samples and deriving a discriminate function analysis model based on the one or more publicly available target code samples and/or information related to the application in development. The discriminant function analysis model module 133 may be configured to conduct any form of linear discriminant analysis (LDA), normal discriminant analysis (NDA), or discriminant function analysis (DFA) to create a model. The discriminant function analysis model module 133 may be configured to determine the variables that discriminate between different target code samples related to their applicability for incorporation into an application in development.

The discriminant function analysis model module 133 may be configured to create one or more discriminant functions which may maximize differences between groups on that function. In the case of multiple discriminant functions, the additional discriminant functions (beyond the first) created by the discriminant function analysis model module 133 will not correlate to the previous function(s). The discriminant function analysis model module 133 may create a model that is capable of separating source code into classes, categories or groups by analyzing predetermined features, characteristics or variables thereof. Thus, the discriminant function analysis model module 133 may be configured to perform a discriminant function analysis that includes continuous independent variables (the features, characteristics or variables) and categorical dependent variables (i.e. the classes, categories or groups).

Various categorical dependent variables may be analyzed and accounted for the discriminant function analysis model module 133. For example, a categorical dependent variable that may be analyzed and accounted for by the model generated by the discriminant function analysis model module 133 may be whether the code is likely to perform a particular function from a list of functions. Another example of a categorical dependent variable that may be analyzed and accounted for by the model generated by the discriminant function analysis model module 133 may be the whether the code is new (or current), old (or decayed, rotted, etc.). Another exemplary categorical dependent variable that may be analyzed and accounted for by the model generated by the discriminant function analysis model module 133 may be the appropriateness or inappropriateness of code for a given application. While these are exemplary categorical dependent variables, many others are contemplated. The discriminant function analysis model module 133 may create a model capable of categorizing, classing or grouping source code into any number of categories, classes or groups. The generated model may create discriminant functions for any categories, classes or groups that could facilitate in discerning whether a source code sample would be applicable to a given development project or application.

Various continuous independent variables, features, characteristics, or the like may be analyzed in predicting categories, classes or groups of source code samples. For example, the length of the code, the language or environment that the code was written, the occurrence of a particular instruction, declaration, loop, statement, command or the like, the number of occurrences of a particular instruction, declaration, loop, statement, command or the like, the number of standard libraries called, the usage of one or more particular standard libraries, or the like, the number of objects, the occurrence or usage of one or more objects, may each be examples of various continues independent variables which may be utilized by the discriminant function analysis model module 133 to generate discriminant functions and/or derive a discriminant function analysis model.

With continued reference to FIG. 1, embodiments of the computer system 120 includes an efficacy module 134. Embodiments of the efficacy module 134 include one or more components of hardware and/or software program code for determining the efficacy of a publicly available target code sample in a given application in development. The efficacy module 134 may utilize the discriminant function analysis model derived by the discriminant function analysis model module 133 to predict whether the publicly available target code sample may be appropriate for a given application.

The efficacy module 134 may be configured to utilize the analysis completed by the analytics module 132 related to the source code in development, and in particular, the type of application of the source code in development. With the information and analysis of the type of application in development, the efficacy module 134 may determine one or more categories (i.e. classes or groups) the publicly available target code sample is categorized. The efficacy module 134 may utilize the discriminant function analysis model to determine the likeliness of whether the target code is likely to fall within the one or more categories (i.e. classes or groups). In the case that the application in development comprises a plurality of categories, the efficacy module 134 may determine the likeliness of the target source code belonging to each required category. The efficacy module 134 may perform an overall analysis of the efficacy of the target source code for the application in development by determining how suitable the publicly available target code sample is for the application in development.

With continued reference to FIG. 1, embodiments of the computer system 120 include a goodness of fit module 135. Embodiments of the goodness of fit module 135 include one or more components of hardware and/or software program code for determining a goodness of fit assessment of the publicly available target source code sample. Various models for goodness of fit are contemplated, including but not limited to Kolmogorov-Smirnov, Anderson-Darling, Cramer-Von-Mises, Shapiro-Wilks and the like. The goodness of fit module 135 may create a Q-Q plot using the Q-Q method in order to determine whether data related to a given publicly available target source code is normally distributed. For example, the goodness of fit module 135 may be configured to take the q-quantile values of the original data related to the publicly available target code and the expected q-quantile values of the standard normal distribution as determined using the discriminant function analysis model (i.e. calculate $x=F(-1)(q)$). The goodness of fit module 135 may further be configured to plot a cumulative distribution function as well as a linear Q-Q plot. The goodness of fit module 135 may be configured to create such goodness of fit plots for visual inspection by a developer, or for internal analysis by the analytics module 132. While the q-quantile values for the data may be utilized by the goodness of fit module 135, the goodness of fit determination may be based on a median, quartile, decile, percentile, analysis, or any appropriate value for q. The goodness of fit module 135 may be configured to determine how close the data representing the publicly available target code is to the normal distribution.

The analytics module 132 may further be configured to utilize the discriminant function analysis model derived by the discriminant function analysis model module 133, the goodness of fit assessment created by the goodness of fit module 135, to rank the publicly available target code relative to other available publicly available target codes for a given software development application. The ranking may be based on the new-ness, or active nature of the publicly available target code (i.e. least decayed, rotted, etc.) relative to other available publicly available target codes, and may or may not account for the given software development application. Thus, analytics module 132 may be configured to determine, using the discriminant function analysis model derived by the discriminant function analysis model module 133, whether a publicly available target code is currently used, or uses outdated, decayed, or rotted software irrespective of the suitability of the code for a given application. The analytics module 132 may likewise be configured to utilize the discriminant function analysis model to determine the most popular way of performing a particular functionality. This popularity characterization may or may not be irrespective of the suitability of the code for a given application.

With continued reference to FIG. 1, embodiments of the computer system 120 include an output module 136. Embodiments of the output module 136 include one or more components of hardware and/or software program code for providing an output to a developer or development platform. The output module 136 may be configured for notifying, alarming, or otherwise transmitting or providing information to a developer. For example, the output module 136 may be configured to provide an efficacy recommendation of publicly available target source code to an application in development. The efficacy recommendation may be an efficacy ranking, an efficacy score, or the like. The ranking or score may be on any indicative scale. The output module 136 may be configured to provide an output of the goodness of fit plots for visual inspection by a developer of an application in development. The output module 136 may be configured to display the results of a discriminant function analysis model, including the various data points distributed across discriminant dimensions. The output module 136 may thus be operably connected to a user interface for displaying information related to the analysis conducted by the analytics module 132 (and sub-modules 133, 134, 135 thereof) allow a user to be provided with this information. The output module 136 may be a recommendation module for making recommendations to developers of applications in development to incorporate one or more publicly available target source code samples.

Referring still to FIG. 1, embodiments of the computer system 120 may be equipped with a memory device 142 which may store information being used by the module structure 130 of the computer system 120. The computer system 120 may further be equipped with a processor 141 for implementing the tasks associated with the system for determining the utility of publicly available source code 100 and perform processing associated with the functionality of the module structure 130.

Figure 2:
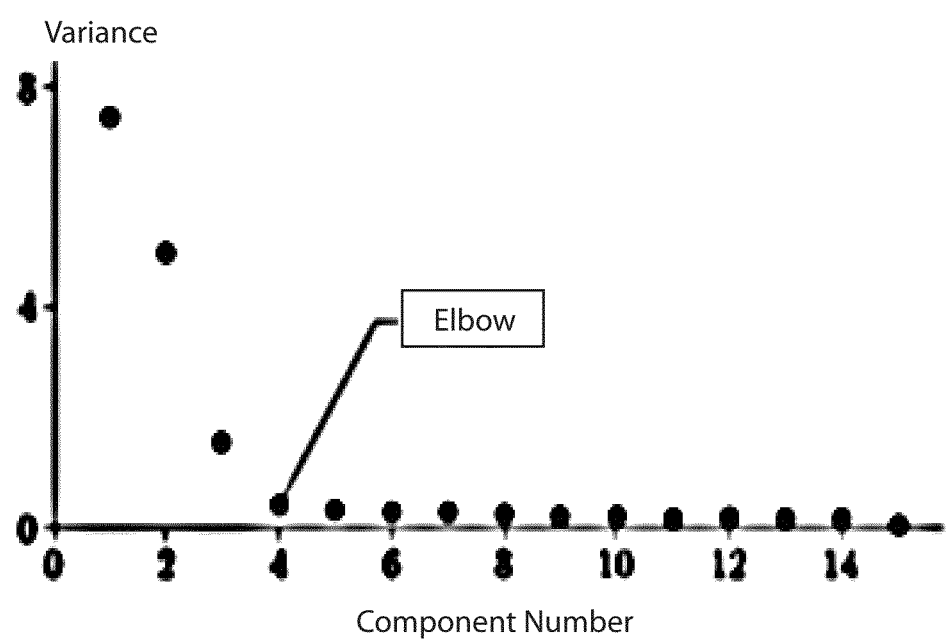
FIG. 2 depicts a skree plot generated by the system of FIG. 1, in accordance with embodiments of the present invention.

In one embodiment, features of different source code that is found in a repository may be collected by the computer system 120. The source code may include features such as code language, lines of code, the number of try/catch blocks, the application name, API end points, number of sev 1 (critical) defects, number of sev 2 (major) defects, number of sev 3 (minor) defects, number of sev 4 (trivial) defects, and developer information. Numerical data associated with the above features may be plotted using discriminant function analysis, in order to identify which features are more prevalent in yielding a sev 1 defect for a given application. A co-variance matrix may be used by the computer system to standardize the numerical values. A skree plot may be utilized, as shown in FIG. 2, for determining which variables or components include the highest degree of variance. The skree plot is shown including an elbow at the fourth component or variable, indicating that the first three variables or components include the highest degree of variance. Once the subset of variables has been identified with high variance (i.e. variables 1-3), co-variance values may then be utilized to form two or more linear functions.

Figure 3:
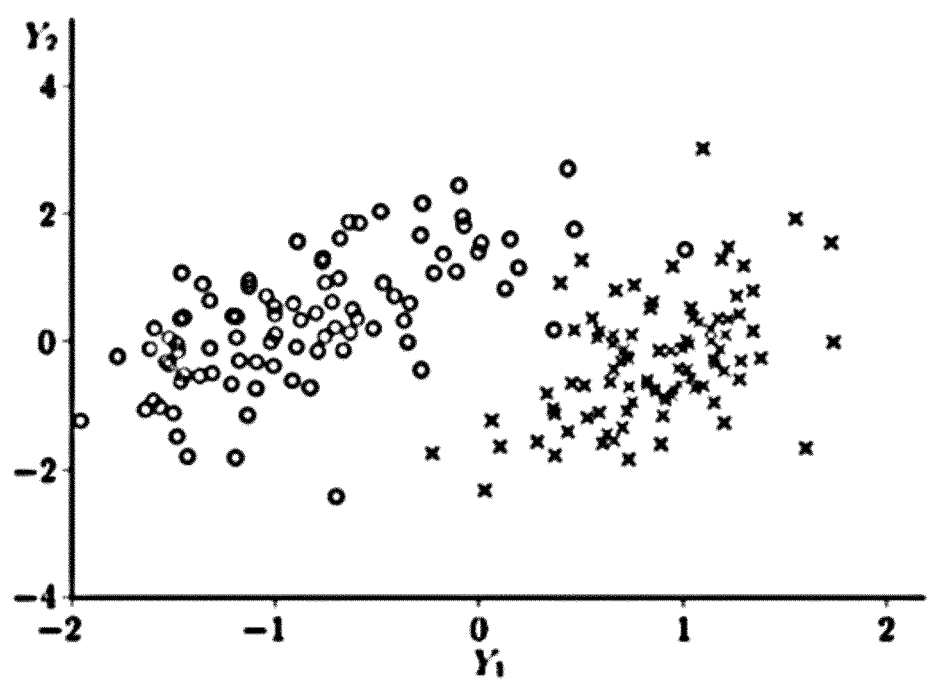
FIG. 3 depicts a derived discriminate function analysis (DEA) model generated by the system of FIG. 1, in accordance with embodiments of the present invention.

Plotting the values of the linear functions for various pieces of code known to include more defects (a first category) or less defects (a second category) may provide insight into which variables produce good code with less defects. FIG. 3 depicts a derived discriminate function analysis (DFA) model 200 generated by the system of FIG. 1, in accordance with embodiments of the present invention, showing code that has a small number of defects (0) plotted with code that has a large number of defects (X). As shown, the good code is clustered together at the right, while the bad code is clustered to the left.

The computer system 120 may be able to use the information and DFA analysis shown in FIG. 3 to differentiate future good code from bad. Co-variances between the features or variables may be calculated to determine which features or variables produce good differentiation between good and bad code. The co-variances may then be standardized. The number of features may need to be reduced to the ones with the highest degree of variance, A discriminant function based on key feature co-variances may be used. Using the DFA mode, the risk level of publicly available target code may be inferred when features or variables of the code are applied to the model.

Figure 4:
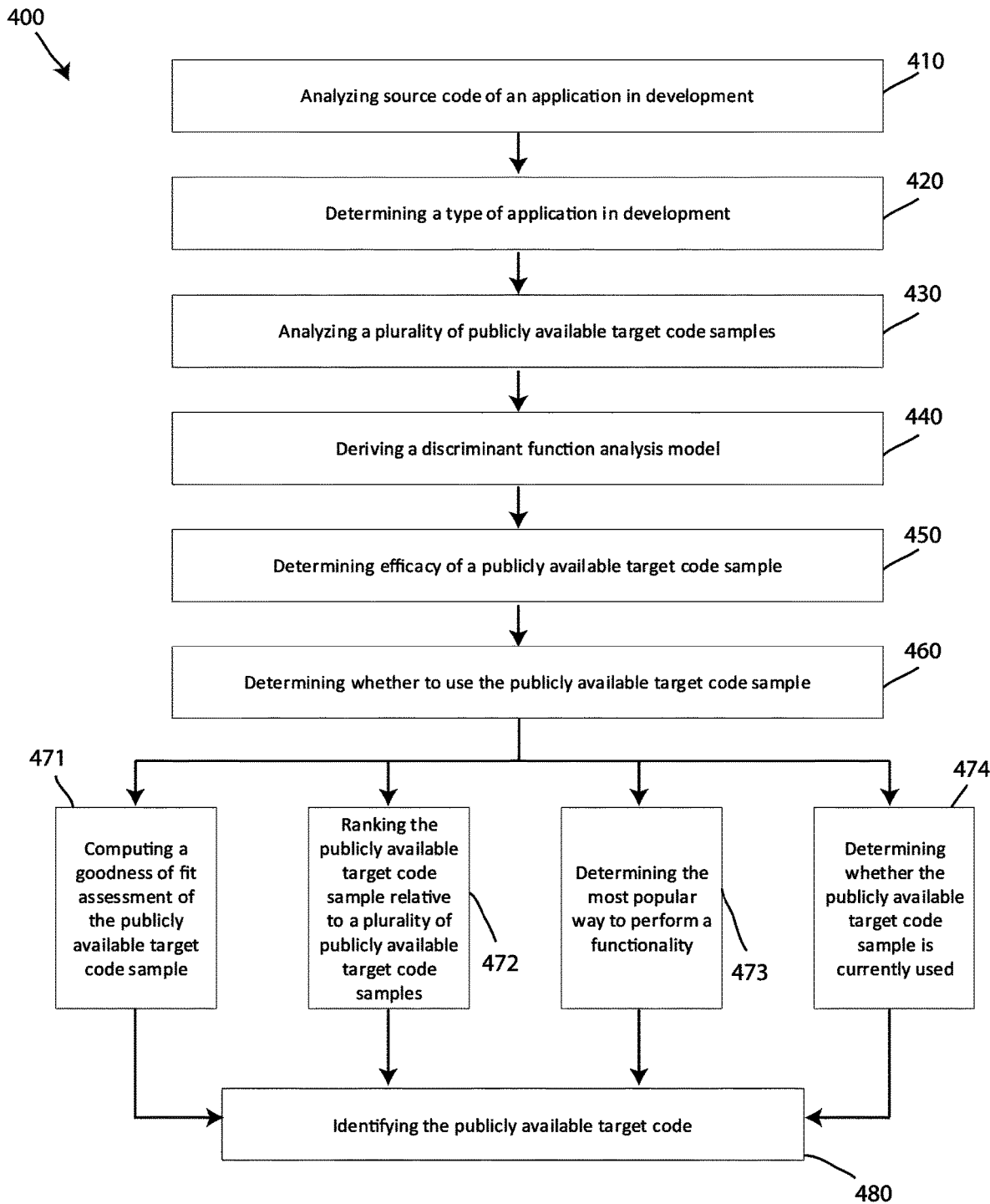
FIG. 4 depicts a flow chart of a method for determining utility of publicly available source code, in accordance with embodiments of the present invention.

FIG. 4 depicts a flow chart of a method 400 for determining utility of publicly, available source code, in accordance with embodiments of the present invention. The method 400 includes a step 410 of analyzing, by one or more processors of a computer system such as the analytics module 132 of the computer system 120, source code of an application in development. The method includes a step 420 of determining, by the one or more processors of the computer system, a type of the application in development, for example utilizing the analyzing conducted in step 410. The method 400 includes a step 430 of analyzing, by the one or more processors of the computer system, a plurality of publicly available target code samples. The method 400 includes a step 440 of deriving, by the one or more processors of the computer system such as by the discriminant function analyzing module 133 of the analytics module 132, the discriminant function analysis model based on an analyzing of the plurality of publicly available target code samples and/or the source code of an application in development. The method 400 includes a step 450 of determining, by the one or more processors of the computer system such as by the efficacy module 134 of the analytics module 132, efficacy of a publicly available target code sample based the discriminant function analysis model, such as the model 200 shown in FIG. 2.

The method 400 includes a step 460 of determining, by the one or more processors of the computer system, whether to use the publicly available target code sample based on the goodness of fit assessment. The step 460 may be accomplished by one or more of steps 471, 472, 473, 474.

For example, determining the utility of the publicly available target code of step 460 may include the step 471 of computing, by the one or more processors of the computer system such as by the goodness of fit module 135 of the analytics module 132, a goodness of fit assessment of the publicly available target code sample to the application in development based on the analyzing the source code of the application in development. The step 471 of determining the goodness of fit may be based on the type of application in development, as determined, for example, in step 420.

The method 400 may include the step 472 of ranking, by the one or more processors of the computer system, the publicly available target code relative to a plurality of publicly available target codes. In one embodiment, the ranking step 472 may be based at least in part on the goodness of fit assessment of the publicly available target code relative a goodness of fit assessment of the plurality of publicly available target codes conducted in step 471.

The method 400 may further include the step 473 of determining, by the one or more processors of the computer system, the most popular way to perform a functionality. For example, if more than one publicly available target code exists, the step 473 may include determining which of the plurality of potential target codes is the most popular based on a historical analysis over, for example, a period of time extending back a predetermined amount from the present.

The method 400 may include a step 474 of determining, by the one or more processors of the computer system, whether the publicly available target code sample is currently used publicly in software. In this step, the method 400 may include performing a determination of whether an analysis on whether the software is current, has degraded or rotted, includes bugs based on a change in the environment to which the code exists, or the like. The step 474 may include determining recent applications, downloads, or uses of the source code.

The method 400 includes a step 480 of identifying, by the one or more processors of the computer system such as by the output module 136 of the computer system 120, the publicly available target code sample based on one or a combination of the steps 460, 471, 472, 473, 474. For example, the method 400 may include providing a recommendation to a user device or user coding platform interface identifying a particular target code for integration into a software development project. The identification of appropriate target code performed in the step 480 may include displaying ranked target code samples based on the goodness of fit with a software application in development.

In addition to identifying target code for integration into a development project, methods described herein may further include identifying code already integrated into a development project at is either appropriate or inappropriate or could be replaced by more optimal publicly available target code should a developer choose. Methods described herein may include identifying code within an application under development that a developer may wish to replace because it is old, decayed, rotted, or otherwise not optimal, recommending a replacement code, and automatically incorporating the replacement code. The automatic incorporation of the replacement code by include providing a developer with a query as to whether the developer wishes to replace code with the identified publicly available target code, and upon receiving confirmation, automatically performing the replacement.

Thus, methods contemplated herein may include utilizing the system for system for determining the utility of publicly available source code 100 of FIG. 1, and the methods 400 for determining the utility of publicly available source code of FIG. 4 to analyze existing code within a completed or in-progress software development project, and automatically providing input to developers that publicly available code exists to accomplish a development task, suggesting the particular publicly available target code to accomplish the development task, and automatically incorporating the particular publicly available target code to accomplish the development task.

Methods may include automatically identifying a software development task as it is being written by a developer based on an analysis of the application in development, including the type or category of the application in development. The recommendations of publicly available target code for incorporating into a development project to accomplish some or a portion of a development task may be made in real time as a developer is working on the development task.

Figure 5:
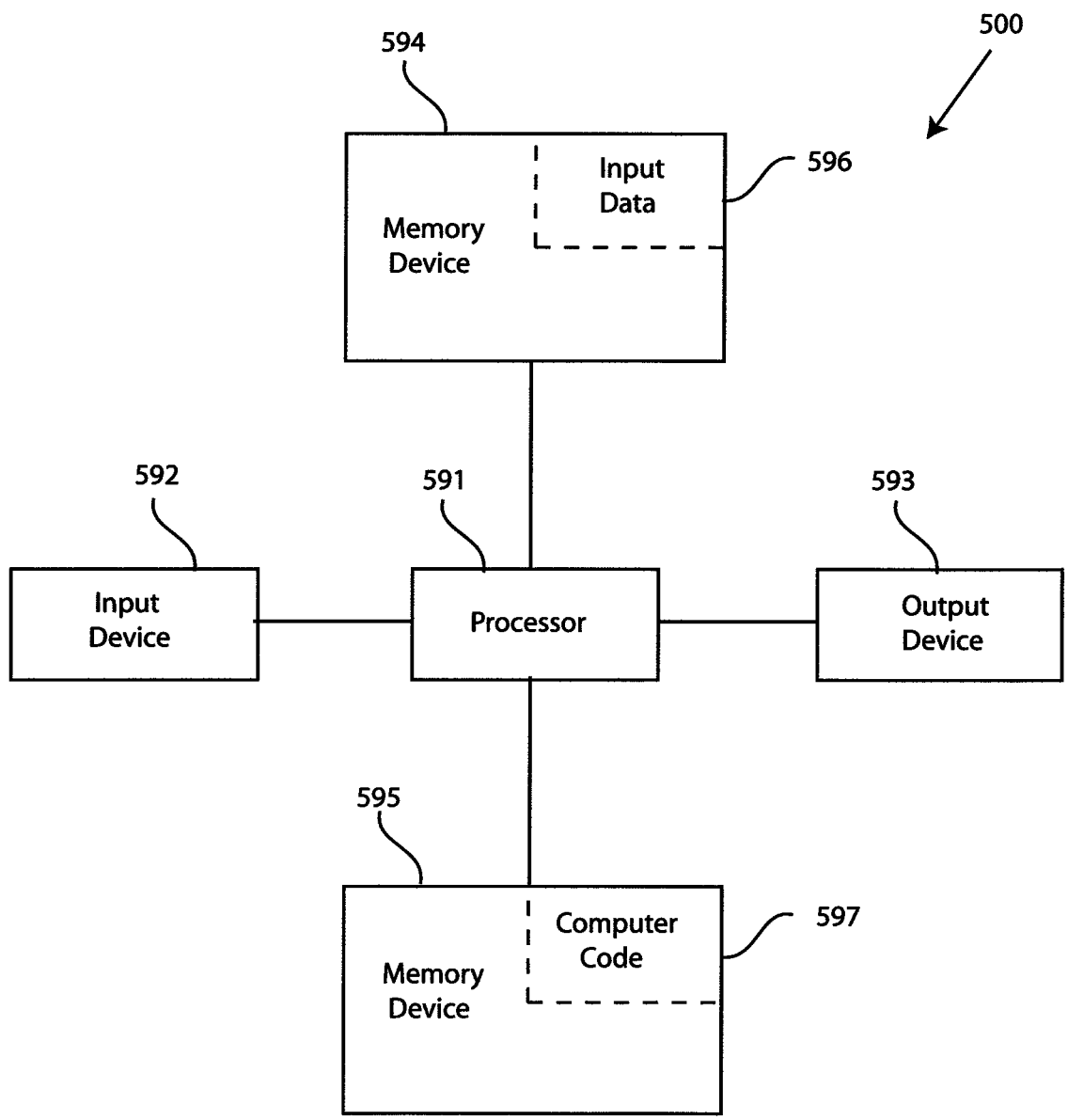
FIG. 5 depicts a block diagram of a computer system for the system for predicting determining the utility of publicly available source code of FIG. 1, capable of implementing methods for determining the utility of publicly available source code of FIG. 4, in accordance with embodiments of the present invention.

FIG. 5 illustrates a block diagram of a computer system that may representative of any computer or computer system within the system for determining the utility of publicly available source code of FIG. 1, capable of implementing methods for determining the utility of publicly available source code of FIG. 4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for determining the utility of publicly available source code, in the manner prescribed by the embodiments of FIG. 4 using the system for determining the utility of publicly available source code of FIG. 1, wherein the instructions of the computer code 597 may be executed by processor 591 via memory device 595. The computer code 597 may include software or program instructions that may implement one or more algorithms for implementing the methods for determining the utility of publicly available source code, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (I.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for determining the utility of publicly available source code. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system provide a system for determining the utility of publicly available source code. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for determining the utility of publicly available source code. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for determining the utility of publicly available source code.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
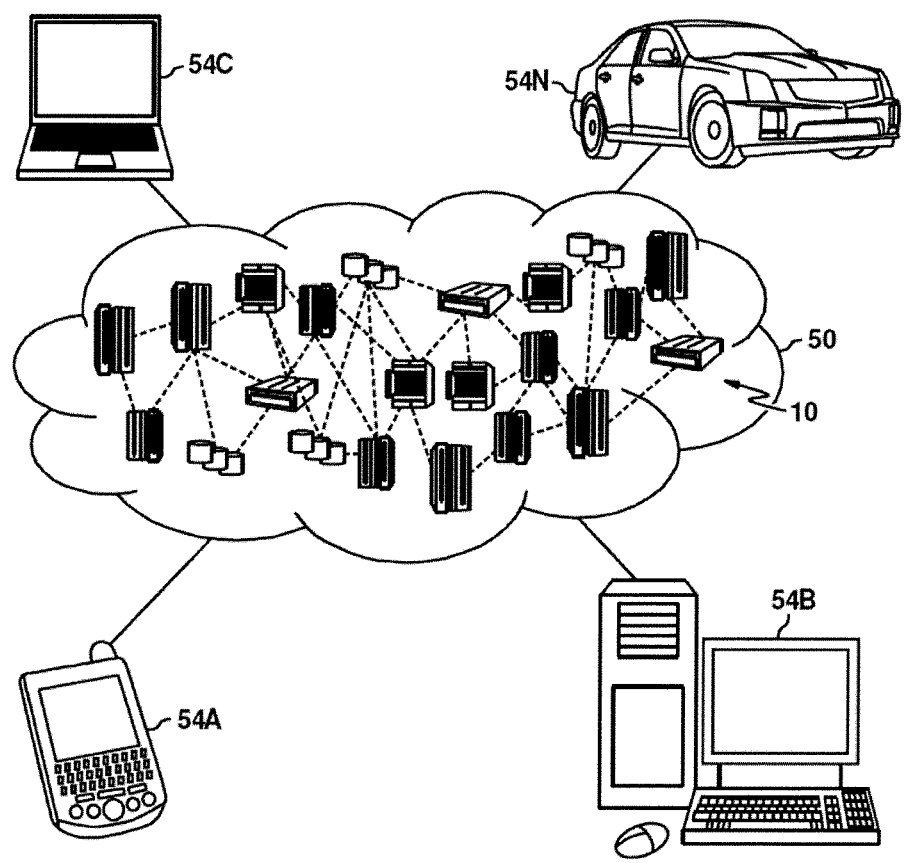
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate, Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
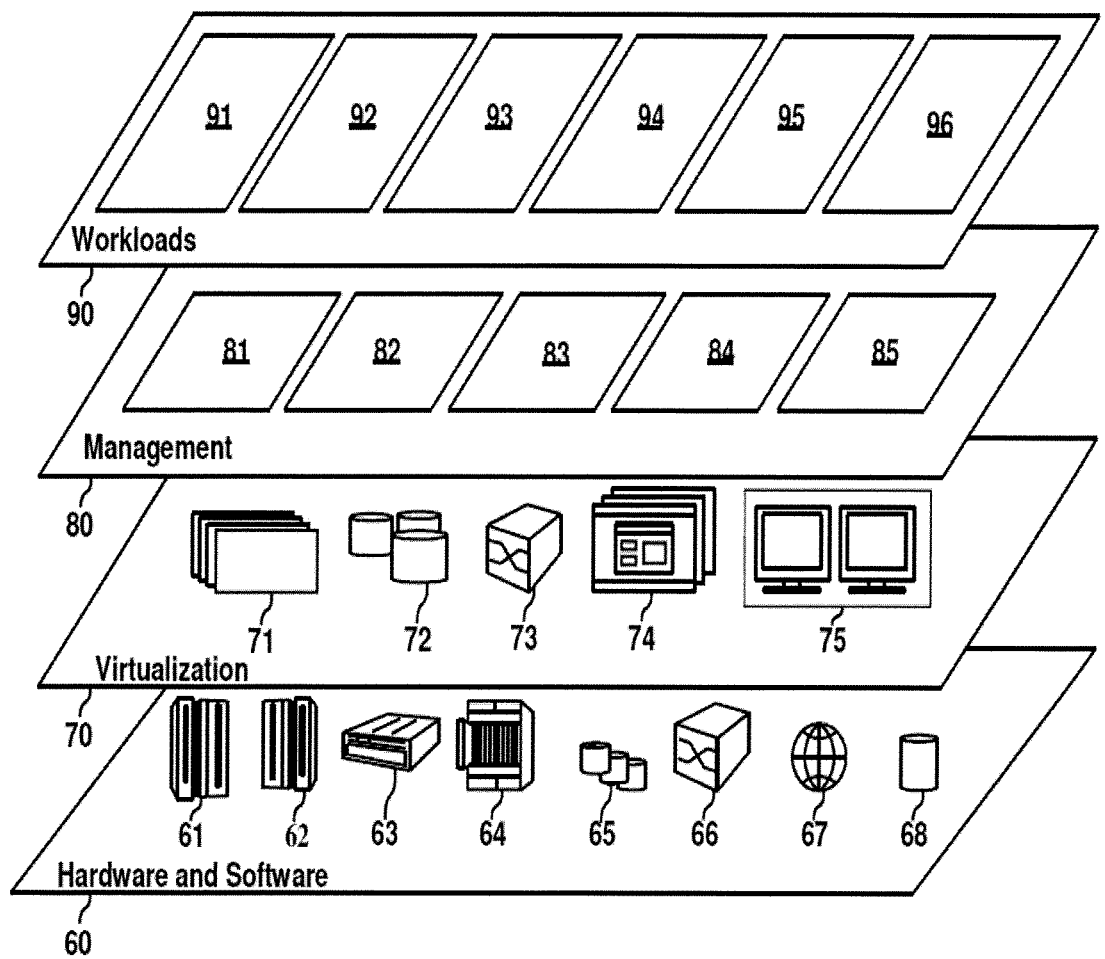
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to determining the utility of publicly available source code 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of determining the utility of publicly available source code, the method comprising:
analyzing, by one or more processors of a computer system, source code of an application in development;
analyzing, by the one or more processors of the computer system, a plurality of public code samples within a public code repository comprising both bad code samples and good code samples;
creating, by the one or more processors of the computer system, a discriminant function analysis model that incorporates each of the plurality of public code samples within the public code repository;
determining, by the one or more processors of the computer system, efficacy of a publicly available target code sample based on the discriminant function analysis model, and determining from the discriminant function analysis model that the publicly available target code sample is not a bad code sample that is decayed or rotted;
computing, by the one or more processors of the computer system, a goodness of fit assessment of the publicly available target code sample to the application in development based on the analyzing the source code of the application in development;
determining, by the one or more processors of the computer system, whether to use the publicly available target code sample based on the goodness of fit assessment; and
recommending, by the one or more processors of the computer system to a developer, the publicly available target code sample based on the goodness of fit assessment.

2. The method of claim 1, further comprising:
analyzing, by the one or more processors of the computer system, a plurality of publicly available target code samples;
deriving, by the one or more processors of the computer system, the discriminant function analysis model based on an analyzing of the plurality of publicly, available target code samples.

3. The method of claim 1, further comprising:
determining, by the one or more processors of the computer system, a type of the application in development from the analyzing, wherein the computing the goodness of fit assessment is further based on the determining the type of the application in development.

4. The method of claim 1, wherein the determining whether to use the publicly available target code sample is based on the goodness of fit assessment satisfying a threshold.

5. The method of claim 1, further comprising:
determining, by the one or more processors of the computer system, whether the publicly available target code sample is currently used publicly in software.

6. The method of claim 1, further comprising:
ranking, by the one or more processors of the computer system, the publicly available target code relative to a plurality of publicly available target codes based on the goodness of fit assessment of the publicly available target code relative a goodness of fit assessment of the plurality of publicly available target codes.

7. The method of claim 1, further comprising:

determining, by the one or more processors of the computer system, the most popular way to perform a functionality; and
identifying, by the one or more processors of the computer system, the publicly available target code sample based on the determining the most popular way to perform the functionality.

8. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method of determining the utility of publicly available source code, the method comprising:
analyzing, by the one or more processors of the computer system, source code of an application in development;
analyzing, by the one or more processors of the computer system, a plurality of public code samples within a public code repository comprising both bad code samples and good code samples;
creating, by the one or more processors of the computer system, a discriminant function analysis model that incorporates each of the plurality of public code samples within the public code repository;
determining, by the one or more processors of the computer system, efficacy of a publicly available target code sample based on a discriminant function analysis model and that the publicly available target code sample is not a bad code sample that is decayed or rotted;
computing, by the one or more processors of the computer system, a goodness of fit assessment of the publicly available target code sample to the application in development based on the analyzing the source code of the application in development;
determining, by the one or more processors of the computer system, whether to use the publicly available target code sample based on the goodness of fit assessment; and
recommending, by the one or more processors of the computer system to a developer, the publicly available target code sample based on the goodness of fit assessment.

9. The computer system of claim 8, the method further comprising:
analyzing, by the one or more processors of the computer system, a plurality of publicly available target code samples;
deriving, by the one or more processors of the computer system, the discriminant function analysis model based on an analyzing of the plurality of publicly available target code samples.

10. The computer system of claim 8, the method further comprising:
determining; by the one or more processors of the computer system, a type of the application in development from the analyzing, wherein the computing the goodness of fit assessment is further based on the determining the type of the application in development.

11. The computer system of claim 8, wherein the determining whether to use the publicly available target code sample is based on the goodness of fit assessment satisfying a threshold.

12. The computer system of claim 8, the method further comprising:
    determining, by the one or more processors of the computer system, whether the publicly available target code sample is currently used publicly in software.

13. The computer system of claim 8, the method further comprising:
    ranking, by the one or more processors of the computer system, the publicly available target code relative to a plurality of publicly available target codes based on the goodness of fit assessment of the publicly available target code relative a goodness of fit assessment of the plurality of publicly available target codes.

14. The computer system of claim 8, the method further comprising:
    determining, by the one or more processors of the computer system, the most popular way to perform a functionality; and
    identifying, by the one or more processors of the computer system, the publicly available target code sample based on the determining the most popular way to perform the functionality.

15. A computer program product, comprising a computer readable hardware storage device storing a computer readable program code, the computer readable program code comprising an algorithm that when executed by one or more processors of a computer system implements a method of determining the utility of publicly available source code, the method comprising:
    analyzing, by the one or more processors of the computer system, source code of an application in development;
    analyzing, by the one or more processors of the computer system, a plurality of public code samples within a public code repository comprising both bad code samples and good code samples;
    creating, b the one or more processors of the computer system, a discriminant function analysis model that incorporates each of the plurality of public code samples within the public code repository;
    determining, by the one or more processors of the computer system, efficacy of a publicly available target code sample based on a discriminant function analysis model and that the publicly available target code sample is not a bad code sample that is decayed or rotted;
    computing, by the one or more processors of the computer system, a goodness of fit assessment of the publicly available target code sample to the application in development based on the analyzing the source code of the application in development;
    determining, by the one or more processors of the computer system, whether to use the publicly available target code sample based on the goodness of fit assessment; and
    recommending, by the one or more processors of the computer system to a developer, the publicly available target code sample based on the goodness of fit assessment.

16. The computer program product of claim 15, the method further comprising:
    analyzing, by the one or more processors of the computer system, a plurality of publicly available target code samples;
    deriving, by the one or more processors of the computer system, the discriminant function analysis model based on an analyzing of the plurality of publicly available target code samples.

17. The computer program product of claim 15, the method further comprising:
    determining, by the one or more processors of the computer system, a type of the application in development from the analyzing, wherein the computing the goodness of fit assessment is further based on the determining the type of the application in development.

18. The computer program product of claim 15, wherein the determining whether to use the publicly available target code sample is based on the goodness of fit assessment satisfying a threshold.

19. The computer program product of claim 15, the method further comprising:
    determining, by the one or more processors of the computer system, whether the publicly available target code sample is currently used publicly in software.

20. The computer program product of claim 15, the method further comprising:
    ranking, by the one or more processors of the computer system, the publicly available target code relative to a plurality of publicly available target codes based on the goodness of fit assessment of the publicly available target code relative a goodness of fit assessment of the plurality of publicly available target codes.

* * * * *